Feb. 12, 1924.  1,483,418
G. J. DUNBAUGH, JR
LIQUID LEVEL INDICATOR
Filed April 10, 1922
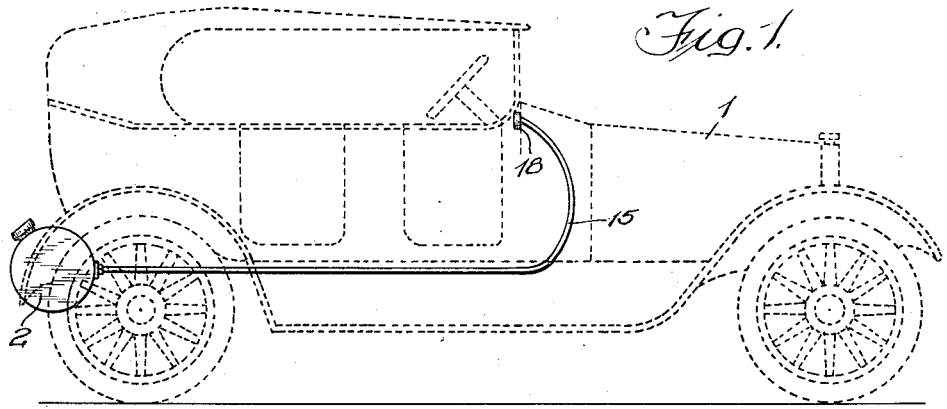
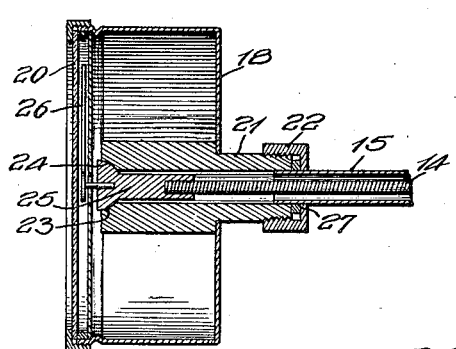 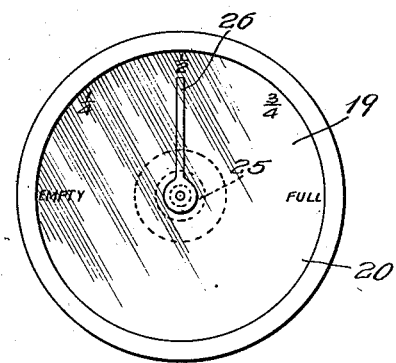
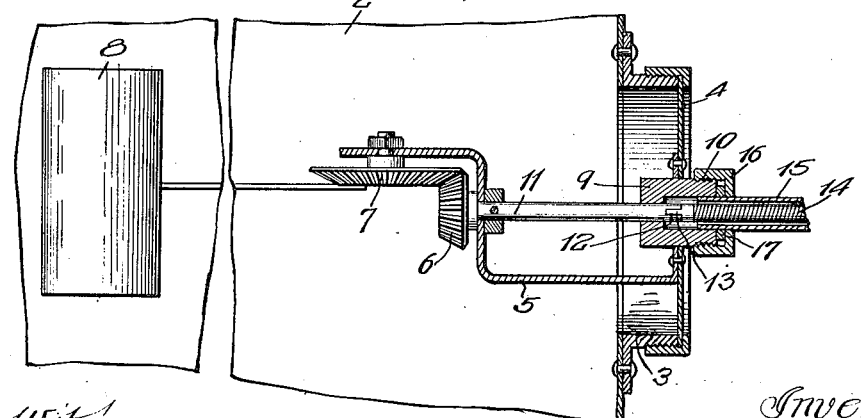
Witnesses:
W. P. Kilroy
Harry R. L. White
Inventor:
George J. Dunbaugh, Jr.

Patented Feb. 12, 1924.

1,483,418

UNITED STATES PATENT OFFICE.

GEORGE J. DUNBAUGH, JR., OF CHICAGO, ILLINOIS, ASSIGNOR TO CHAMPION MANUFACTURING COMPANY, OF CHICAGO, ILLINOIS, A CORPORATION OF ILLINOIS.

LIQUID-LEVEL INDICATOR.

Application filed April 10, 1922. Serial No. 551,180.

*To all whom it may concern:*

Be it known that I, GEORGE J. DUNBAUGH, Jr., a citizen of the United States, residing at Chicago, in the county of Cook and State of Illinois, have invented certain new and useful Improvements in Liquid-Level Indicators, of which the following is a description.

My invention relates to improvements in indicating means, and more particularly to means for indicating the level of liquid in a container at remote points, as for instance for indicating at the dashboard of a motor vehicle the level of the gasoline in the tank at the rear of the car.

The invention has among its other objects the production of a device of the kind described which is simple, convenient, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claim.

In the drawings, wherein like references characters indicate like or corresponding parts, Fig. 1 shows my device as applied to a motor vehicle;

Fig. 2 is a sectional view of the dial portion of the device;

Fig. 3 is a plan view of the dial, and

Fig. 4 is a sectional view of the float and means operated thereby.

In the drawings, wherein I have illustrated the preferred embodiment of my invention, there is shown a motor vehicle 1, having a container or tank 2 arranged at any point thereof, as for instance at the rear, said tank shown having the usual filling opening and also an outlet opening 3 therein. Generally, in order to ascertain the quantity of liquid in the tank it is necessary that the operator leave the driving seat to go to the tank and either read the amount of liquid in the tank by a suitable gauge thereon, or else insert a stick or the line into the tank for the same purpose. This is sometimes inconvenient on a motor boat and usually impossible on an airplane, when in motion. With my improved device it is not necessary that the operator leave his seat to ascertain the level of the liquid in the tank, as I have provided means for indicating the level in the tank at any suitable point, as for instance on the instrument board or dashboard.

A cap 4 is adapted to be positioned over the outlet 3 to close the same, said cap carrying a bracket 5 extending therefrom to be positioned inwardly of the tank.

A pair of gears of the desired type, as shown bevel gears 6 and 7, adapted to mesh with each other, are carried on the bracket 5, one of the gears, as for instance 7, carrying an arm having a float 8 at its end, said float arranged to be controlled by the liquid in the tank. Obviously spur gears or the equivalent may be used in place of the bevel gears. A plug or bushing 9 is arranged in an aperture through the cap 4 and projects interiorly and exteriorly of the tank, the exterior portion being preferably screw-threaded, as at 10. The plug 9 is also centrally apertured to receive the end of a shaft 11 driven by the gear 6. The outer end of the shaft 11 has a slot 12 thereacross to slidably receive a tongue 13, carried at the end of a flexible drive shaft 14, so that said drive shaft may be connected in driving engagement with the shaft 11. A sheath or conduit 15 encircles the shaft 14 and extends into the aperture in the plug 9. A flanged cap 16 is screw threaded onto the threaded end of the plug 9, and there may be a collar or washer 17 which is secured on 15 and is arranged between the disk and the end of the plug, as shown in Fig. 4. The same thus anchors the conduit 15, in place. The flexible shaft and conduit may be brought to any desired or convenient part of the vehicle, as shown it is preferably extended through the instrument board thereof, as shown in Fig. 1.

The indicator comprises a casing 18, having a dial 19 carried thereby and covered with a glass 20 or its equivalent. The casing is apertured to receive a sleeve 21 therethrough, said sleeve having a portion interiorly of the casing and a portion projecting exteriorly thereof, the exteriorly projecting portion being screw-threaded to receive a flanged cap 22. The sleeve 21 and disk 22 having registering openings axially therethrough to receive the end of the conduit 15, as shown in Fig. 2, said axial openings being sufficiently large so that the flexible shaft 14 will be out of contact with the wall thereof. One end of the sleeve 21 is provided with a spherical socket bearing or recess 23 therein, adapted to receive a partly spherical head 24 of a stub shaft 25, the other end of the stub shaft 25 being connected to the end of the flexible shaft 14. The pointer or needle 26 may be connected directly to the head end of the stub shaft 25, as shown. A collar 27 may be interposed on the conduit between the cap 22 and the end of the sleeve 21, to anchor the conduit in place if so desired.

In operation, the float 8 will be moved up or down, as determined by the level of the liquid in the tank, such movement being communicated, through the gears 6 and 7 or their equivalent to the flexible shaft 14, which is directly connected to the stub shaft 25 to actuate the pointer 26. Thus one is able to ascertain at a glance the level of the liquid in the tank without leaving the driving seat. Furthermore, there is no interference with the filling operation of the tank because the indicating means does not extend through said filling inlet.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

In a device of the kind described and in combination, a closure member adapted to be arranged at the opening of a reservoir, a bracket carried by said member comprising a pair of parallel legs spaced apart, and a leg extending transversely from the free end of one of said parallel legs, said last mentioned adjacent mutually transverse legs each provided with an aperture in mutually perpendicular axes, a gear rotatably journaled in each of said apertures and in mesh, a float carried by one of said gears, an indicator adapted to be mounted at a point remote from said reservoir, a flexible shaft detachably connected to the other of said gears and to said indicator, said indicator comprising a casing having a dial, a pointer movable across the face of said dial, a hollow sleeve in said casing and through which said flexible shaft extends out of contact therewith, a rotatable shaft in said sleeve and directly connected with and engaging the opposed end of said flexible shaft, the other end of said rotatable shaft enlarged so as to form a spherical bearing surface, said hollow sleeve provided with a spherical recess to receive said spherical bearing.

In testimony whereof, I have hereunto signed my name in the presence of two subscribing witnesses.

GEORGE J. DUNBAUGH, Jr.

Witnesses:
 Roy W. Hill,
 Ruth W. Ephraim.